United States Patent Office 3,449,256
Patented June 10, 1969

3,449,256
METHYLENEBIS(PHENYL ISOCYANATE) COMPOSITIONS AND PREPARATION THEREOF
William J. Farrissey, Jr., North Branford, and Alec Odinak, New Haven, Conn., assignors to The Upjohn Company, Kalamazoo, Mich., a corporation of Delaware
No Drawing. Filed Jan. 19, 1966, Ser. No. 521,491
Int. Cl. C07c 119/04; B01j 1/18
U.S. Cl. 252—182           13 Claims

ABSTRACT OF THE DISCLOSURE

Methylenebis(phenyl isocyanate), which is a solid of melting point ca. 40° C., and polymethylene polyphenyl polyisocyanates containing more than about 65% methylenebis(phenyl isocyanate), which normally deposit solids on standing, are transformed to storage stable liquids by (a) heating the starting isocyanate at 160° to 250° C. with 0.1% to 3% by weight of a trihydrocarbyl phosphate (trialkyl phosphate, e.g. triethyl phosphate, is preferred) until the isocyanate equivalent of the mixture is within the range of 138 to 200 and (b) blending the product so obtained with sufficient untreated starting isocyanate to give an isocyanate equivalent of 127 to 140 in the final product.

---

This invention relates to novel isocyanate containing compositions and to processes for their preparation and is more particularly concerned with novel, storage stable compositions derived from methylenebis(phenyl isocyanate), with processes for their preparation, and with polyurethanes derived therefrom.

One of the diisocyanates commonly used in the preparation of both cellular and noncellular polyurethanes is methylenebis(phenyl isocyanate). This material is available commercially either in substantially pure form or in admixture with related polyisocyanates having higher functionality. The latter mixtures are generally produced by phosgenation of a mixture of polyamines produced by acid condensation of formaldehyde and aniline; see, for example, U.S. Patents 2,683,730, 2,950,263, and 3,012,008. Polymethylene polyphenyl isocyanate mixtures of this nature which contain from about 35 to about 65 percent by weight of methylenebis(phenyl isocyanates), the remainder of said mixture being polymethylene polyphenyl isocyanates of functionality higher than 2.0, are normally liquids at temperatures of about 15° C. and higher and show no tendency to solidify or to deposit solid material even on storage for a prolonged period under a wide range of environmental temperature. Such mixtures therefore present no difficulties, caused by presence of undesirable solid material, in handling or dispensing through conventional polyurethane foam and elastomer formulation mixing machines.

Polymethylene polyphenyl isocyanate mixtures prepared as described above which contain above about 65 percent by weight of methylenebis(phenyl isocyanates) show a tendency to deposit small amounts of solid, generally comprising methylenebis(phenyl isocyanates). The tendency to deposit solid, and the amount of solid deposited, is a function of increasing content of methylenebis(phenyl isocyanate). Further, pure methylenebis(phenyl isocyanate) itself, i.e., methylenebis(phenyl isocyanate) substantially free from polymethylene polyphenyl isocyanate, is normally a solid at room temperature (about 20° C.) having a melting point of the order of 35 to 42° C. These materials, particularly substantially pure methylenebis(phenyl isocyanate), accordingly present a problem in that they have to be melted and maintained in a molten state in order that they can be transferred by piping and pumping arrangements normally employed in the preparation of polyurethanes.

It is an object of the invention to convert a methylenebis(phenyl isocyanate) composition which is normally solid at temperatures above 15° C. or which shows a tendency to deposit solid material on storage at ambient temperatures, to a storage stable liquid product which is suitable for transfer as a liquid using conventional procedures and apparatus for the preparation of polyurethanes. It is a further object of the invention to provide a liquid isocyanate composition which can be used in the preparation of all types of polyurethanes for which the unmodified methylenebis(phenyl isocyanate) is currently employed.

These and other objects of the invention are accomplished by means of the process of the invention. The latter, in its broadest aspect, is a process for producing an isocyanate composition which is a stable liquid at temperatures above about 15° C. which process comprises heating a methylenebis(phenyl isocyanate) which is not normally a stable liquid at about 15° C. with from about 0.1% to about 3% by weight of a trihydrocarbylphosphate at a temperature within the range of about 160° C. to about 250° C. until the isocyanate equivalent of the mixture is within the range of about 138 to about 200 and blending the product so obtained with sufficient untreated methylenbis(phenyl isocyanate) to obtain a final mixture having an isocyanate equivalent within the range of about 127 to about 140.

The term "methylenebis(phenyl isocyanate) which is not normally a stable liquid at about 15° C." is inclusive of methylenebis(phenyl isocyanate) itself and of polymethylene polyphenyl isocyanate having a content of methylenebis(phenyl isocyanate) greater than about 65% by weight, which compositions, as discussed above, have a tendency to deposit solid material on storage for prolonged periods. Methylenebis(phenyl isocyanate) itself can exist in various isomeric forms and is generally available commercially as the substantially pure 4,4'-isomer or as a mixture of this isomer and minor proportions (up to about 15%) of the 2,4-isomer. It is to be understood that all these various forms of methylenebis(phenyl isocyanate) can be employed in the process of the invention.

The term "hydrocarbyl" as it is employed throughout the specification and claims means the monovalent radical obtained by removing one hydrogen atom from the parent hydrocarbon, preferably from a parent hydrocarbon containing from 1 to 12 carbon atoms, inclusive. Illustrative of such hydrocarbyl groups are: alkyl such as methyl, ethyl, propyl, butyl, pentyl, hexyl, octyl, decyl, dodecyl, and the like, including isomeric forms thereof; alkenyl such as allyl, butenyl, pentenyl, hexenyl, octenyl, dodecenyl, and the like, including isomeric forms thereof; aralkyl such as benzyl, phenethyl, phenylpropyl, benzhydryl, naphthylmethyl, and the like; aryl such as phenyl, tolyl, xylyl, naphthyl, biphenlyl, and the like; cycloalkyl such as cyclobutyl, cyclopentyl, cyclohexyl, cycloheptyl, cyclooctyl and the like, including isomeric forms thereof; and cycloalkenyl such as cyclopentenyl, cyclohexenyl, cycloheptenyl, and the like, including isomeric forms thereof.

The preferred trihydrocarbyl phosphates employed in the process of the invention are the trialkylphosphates wherein alkyl contains from 1 to 12 carbon atoms, inclusive, such as methyl, ethyl, propyl, butyl, pentyl, hexyl, heptyl, octyl, nonyl, decyl, undecyl, dodecyl, and isomeric forms thereof.

The discovery that the above process can be employed to produce the storage stable liquid compositions of the invention is both surprising and unexpected. Thus, it has been suggested previously that heating diisocyanates with a trihydrocarbyl phosphate produces the corresponding polycarbodiimides; see, for example, U.S. Patent 3,056,835. It has also been suggested (see, Example 3 of U.S. Patent 3,152,162) that heating methylenebis(phenyl isocyanate) alone, in the absence of any catalyst, produces a product which crystallizes upon standing at room temperature. Accordingly it is all the more surprising to find that treating methylenebis(phenyl isocyanate) under the conditions described above produces a storage stable liquid product.

Compositions containing methylenebis(phenyl isocyanate), particularly substantially pure methylenebis(phenyl isocyanate), tend to dimerize on standing for prolonged periods and in many cases such products, after prolonged storage, contain from about 2% to about 5% dimer. When such dimer-containing compositions are melted prior to use the dimers remain as a suspension. It has been found that such dimer-containing products can be subjected, without any prior treatment, to the process of the invention to give products which are homogeneous liquids and which show greatly reduced tendency to dimerize on prolonged storage. This finding represents a further unexpected advantage in the process of the invention.

The process of the invention is a two-step process which is carried out as follows. In the first step of said process the methylenebis(phenyl isocyanate) to be treated and the trihydrocarbyl phosphate are brought together in any convenient manner in the proportions and within the temperature range set forth above. This step of the process can be carried out using a batch procedure, or, in a particular aspect of the invention to be described hereinafter, using a continuous process. The mixture is maintained at a temperature within the stated range of about 160° C. to about 250° C. until the isocyanate equivalent of the mixture is within the range of about 138 to about 200.

The method used to determine the isocyanate equivalents to which reference is made throughout this specification and claims is that described in ASTM D1638-60T with the modification that the test sample is heated to reflux in dry toluene in the presence of the dibutylamine and the mixture is then held at reflux for 45 minutes before cooling and continuing the specified procedure.

The period of time for which the mixture of methylenebis(phenyl isocyanate) and trihydrocarbyl phosphate is heated in order to produce a mixture having an isocyanate equivalent within the above range is a function of both the amount of trihydrocarbyl phosphate employed and the reaction temperature. Generally speaking the heating time required varies from about one quarter of an hour to about 4 hours, although shorter and longer times of heating can be employed depending on the particular trihydrocarbyl phosphate and reaction conditions used.

The heating time required to produce a mixture having the desired isocyanate equivalent can be determined readily on an empirical basis by heating aliquots of the mixture of isocyanate and trihydrocarbyl phosphate at the desired heating temperature for different lengths of time and determining the isocyanate equivalent of the various test samples so obtained.

When carrying out the first step of the process of the invention on a continuous basis, a mixture of the methylenebis(phenyl isocyanate) starting material and the trihydrocarbyl phosphate is passed through a heating zone in which the mixture is heated at the desired temperature. The rate of flow of mixture through the heating zone is adjusted so that the period of residence in the heating zone falls within the required range as determined using the procedures and criteria described above. A wide variety of conventional apparatus can be employed for this purpose. Particularly useful is apparatus of the type in which the mixture to be heated is spread in the form of a thin film over the walls of the heating vessel. Using apparatus of this type the rate of heat transfer is of a higher order and the residence time in the heating zone can be correspondingly reduced. A typical example of such apparatus is that set forth in U.S. Patent 2,927,634.

Another type of apparatus which can be employed to carry out the process of the invention is that in which the mixture to be heated, in this case the mixture of methylenebis(phenyl isocyanate) and trihydrocarbyl phosphate, is passed under gravity into a heated, turbulent mixing zone from which it passes to a quiet zone and finally to a dead zone. The treated material is recovered from the dead zone at a rate equal to the rate of introduction of feed to the mixing zone, said rate being chosen so as to provide a suitable residence time in the reactor necessary to carry out the process of the invention.

A typical example of the above type of apparatus is composed of a cylindrical vessel mounted with its axis substantially vertical. The upper portion of said vessel is provided with heating means such as steam coils and the like and stirrer means capable of producing a turbulent zone. Said upper portion of the vessel is separated from the lower portion of said vessel by a zone which offers restricted passage to the flow of liquid and which serves as the "quiet zone" referred to above. The latter zone is generally packed with inert granular material, sintered glass, wire gauze, and the like materials offering resistance to free flow of liquid, said materials being supported between two baffle plates. The portion of the vessel below this quiet zone is the so-called "dead zone" in which the material passing under gravity from the quiet zone collects. Exit means are provided for removing from the vessel the material which collects in the quiet zone. In a convenient form of apparatus the exit means comprises an open tube, the lower end of which is connected to a lower point in the quiet zone and the upper and open end of which is arranged to discharge fluid at a point outside the reaction vessel but in the same horizontal plane as the intended upper level of reaction mixture in the vessel. Using this system the rate of discharge of reaction product from the vessel is automatically determined by the rate at which reaction mixture is fed into the vessel and this in turn governs the average residence time of reaction mixture in the vessel.

It is to be understood that the above types of reaction vessel are given as examples only and that, as will be obvious to one skilled in the art, other types of reaction vessel can be used in carrying out the process of the invention. The invention is not limited to the use of any particular type of reaction vessel but can be carried out in a variety of ways provided the various limitations as to the reaction time and temperature set forth above are observed.

The same considerations as to reaction time, reaction temperature, and concentration of trihydrocarbyl phosphate apply when carrying out the process of the invention on a continuous basis and on a batch basis. In general, it is found that the reaction time necessary for any combination of reaction temperature and concentration of trihydrocarbyl phosphate is lower when operating on a continuous basis but said reaction time is still within the limits set forth above. The most appropriate reaction time in any instance can be determined using the criteria set forth above.

In the second step of the process of the invention the material obtained in the first step, whether this has been produced by a batch or continuous procedure as described above, is blended with methylenebis(phenyl isocyanate) starting material until the final product has an isocyanate equivalent within the range of about 127 to about 140. The blending of the material obtained in the first step of the process of the invention and of methylenebis(phenyl isocyanate) starting material can be accomplished in a convenient manner by simple admixing using manual or mechanical stirring. If the methylenebis(phenyl isocyanate) starting material employed for this blending step is not a homogeneous liquid at ordinary temperatures (i.e., about 20° C.) it is preferable to heat said material until a homogeneous fluid is obtained prior to the blending step. Alternatively the blending can be carried out at a temperature at which the methylenebis (phenyl isocyanate) is a homogeneous liquid, for example, by mixing the components at ordinary temperature (circa 20° C.) and heating the resulting mixture until a homogeneous fluid is obtained.

The temperature at which the methylenebis(phenyl isocyanate) starting material is heated, either alone prior to blending, or in admixture with the material obtained in the first step of the process of the invention, varies according to the nature of said starting material. In no case is it necessary to employ temperatures above about 100° C. and generally speaking the temperature employed ranges from about 25° C. to about 80° C.

In a particular embodiment of the invention the material obtained at the end of the heating period of the first stage of the process is allowed to cool, or is cooled in appropriate manner, to a temperature of the order of about 50° C. to about 100° C. and the methylenebis-(phenyl isocyanate) starting material, either premelted or still in a partially or wholly solid state, is added thereto with appropriate mixing. By suitable choice of conditions it is possible to accomplish the blending in an expeditious manner without the need to supply additional heat to produce a homogeneous final product.

As previously discussed the methylenebis(phenyl isocyanate) starting material employed in the above blending process, in common with all such materials which have been subjected to storage, frequently contains small proportions, up to about 5%, of dimeric material. This material is preferably removed from the methylenebis-(phenyl isocyanate) before employing the latter in the blending procedure. Advantageously this can be effected by melting the methylenebis(phenyl isocyanate) prior to blending. The dimeric material remains as a solid in the molten material and can be separated therefrom readily by filtration, centrifugation, decantation, and the like techniques.

The methylenebis(phenyl isocyanate) employed as the component for blending with the material obtained from the first step of the process of the invention, is preferably material of the same composition as that employed as starting material in the aforesaid first step. However, material of differing compositions can be used in the two steps. For example, when a polymethylene polyphenyl isocyanate mixture containing approximately 70% by weight of methylenebis(phenyl isocyanate) is employed as starting material in the first step of the process, the material obtained in said first step can, if desired, be blended with essentially pure methylenebis(phenyl isocyanates) in the second step of the process.

The isocyanate compositions obtained in accordance with the process of the invention are stable on storage for prolonged periods at temperatures of 15° C. and in many cases are stable on storage at temperatures down to about 0° C. and below. Further, although prolonged exposure to a temperature lower than the above levels may cause a composition of the invention to solidify, said composition can be readily liquified by raising the temperature and will again remain as a stable liquid on further storage at temperatures above about 15° C.

A particularly surprising finding is that methylenebis (phenyl isocyanate), which is normally a solid at temperatures of 15° C. (melting point circa 40° C.) can be converted by the process of the invention to a liquid composition which is a stable liquid on prolonged storage at about 15° C. but which has been blended with sufficient starting material so that it has an isocyanate equivalent of the order of about 128. Since the theoretical equivalent of the starting material is 125 it will be seen that the resulting fluid material approximates very closely the isocyanate equivalent of the starting material and yet has the highly desirable advantage of being an easily handled liquid as opposed to a solid.

The storage stable liquid isocyanate compositions obtained according to the invention can be used for all purposes for which the original unmodified methylenebis (phenyl isocyanate) can be used. Thus the isocyanate compositions of the invention can be used in the preparation of a variety of polyurethanes, both cellular and non-cellular, which are presently prepared using unmodified methylenebis(phenyl isocyanate). Such polyurethanes include flexible, semi-rigid, and rigid foams, elastomers including fibres and filaments, sealants, supported and unsupported films, and the like.

Methods for preparing these various compositions are well known in the art; see, for example, Saunders et al., Polyurethanes, Chemistry and Technology, Part II, Interscience Publishers, New York (1962). In general the physical properties of the polyurethane compositions prepared from the isocyanate compositions are at least as good as the properties of the corresponding compositions obtained using unmodified methylenebis(phenyl isocyanate).

The following examples describe the manner and process of making and using the invention and set forth the best mode contemplated by the inventors of carrying out the invention but are not to be construed as limiting.

EXAMPLE 1

A mixture of 4000 g. of methylenebis(phenyl isocyanate) [M.P. 37 to 41° C.; found by vapor chromatography to contain 90% by weight of 4,4'-methylenebis (phenyl isocyanate) and 10% by weight of the corresponding 2,4'-isomer; obtained by distillation of a mixture of polyisocyanates produced by phosgenation of a mixture of polyamines which latter was obtained by condensation of aniline and formaldehyde in the presence of hydrochloric acid] and 40 g. of triethylphosphate was heated for 3.5 hours at a temperature of 232° C. and the reaction product was cooled to room temperature (25° C.). The material so obtained was a liquid having an isocyanate equivalent of 181, a viscosity of 860 cps. at 25° C. and $n_D^{21}$ 1.6346.

Aliquots of the material obtained as described above were then blended with varying proportions of the methylenebis(phenyl isocyanate) employed as starting material in the above process. The blends were each prepared by heating the mixture of components to 60° C. under nitrogen until a homogeneous liquid was obtained and then cooling the product to approximately 25° C. Each blend was stored in a moisture-proof container and allowed to stand at ambient room temperature (15 to 25° C.). The composition of the blends and various properties thereof are recorded in the following table. Component A is the material of isocyanate equivalent 181 obtained by treatment of methylenebis(phenyl isocyanate) with triethylphosphate as described above. Component B is methylenebis(phenyl isocyanate) starting material. The proportion of each component is expressed as parts by weight.

TABLE I

| Blend No. | Component A | Component B | Isocyanate equivalent | $n_D^{21}$ | Freezing point, ° C. |
|---|---|---|---|---|---|
| 1 | 45.1 | 54.9 | 143.5 | 1.6163 | <−20 |
| 2 | 27.0 | 73.0 | 136.3 | 1.6108 | −14.5 |
| 3 | 17.9 | 82.1 | 131.5 | 1.6080 | −3.0 |

After storage for 2 weeks at ambient room temperature none of the above blends showed any deposition of solid.

Using the procedure described above but replacing the triethylphosphate employed in the first stage by tripropylphosphate, trihexylphosphate, triisobutylphosphate, triphenylphosphate, and tribenzylphosphate, there are obtained isocyanate compositions which remain liquid on storage for prolonged periods at temperatures as low as 15° C.

EXAMPLE 2

A mixture of 4000 g. of methylenebis(phenyl isocyanate) (identical to the material employed as starting material in Example 1) and 40 g. of triethylphosphate was heated for 2.5 hours at 218° C. and the reaction product was cooled to room temperature (circa 25° C.). The material so obtained was a liquid having an isocyanate equivalent of 140, a viscosity of 31 cps. at 25° C. and $n_D^{21}$ 1.6127.

Aliquots of the material obtained as described above were then blended with varying proportions of the methylenebis(phenyl isocyanate) employed as starting material in the above process. The blends were each prepared by heating the mixture of components to 60° C. under nitrogen until a homogeneous liquid was obtained and then cooling the product to approximately 25° C. Each blend was stored in a moisture-proof container and allowed to stand at ambient room temperature (15 to 25° C.). The composition of the various blends and various properties thereof are recorded in the following table. Component C is the material of isocyanate equivalent 140 obtained by heat treatment of a mixture of methylenebis(phenyl isocyanate) and triethylphosphate as described above. Component D is the methylenebis(phenyl isocyanate) taken from the same batch as starting material. The proportion of each component is expressed as parts by weight.

TABLE II

| Blend No. | Component C | Component D | Isocyanate equivalent | $n_D^{21}$ | Freezing point, °C. |
|---|---|---|---|---|---|
| 1 | 70 | 30 | 135.4 | 1.6096 | −20 |
| 2 | 50 | 50 | 132.2 | 1.6076 | −7.2 |
| 3 | 32 | 68 | 129.4 | 1.6056 | +8.6 |

After allowing to stand at approximately 20° C. for 1 week, Blend No. 3 showed slight turbidity and was filtered. The filtrate so obtained showed no sign of deposition of solid after standing at ambient temperature (range of 15° C. to 25° C. approximately) for 2 weeks. Blends Nos. 1 and 2 showed no sign of deposition of solid after allowing to stand under the same storage conditions for the same period as Blend No. 3.

EXAMPLE 3

The apparatus employed in the process described in this example comprised an 18 inch length of 4 inch I.D. glass pipe with axis aligned vertically and designed as a fully baffled stirred reactor. The lower 3″ of the pipe formed a dead zone above which was a 2″ thick wire mesh screen having 90% void space defining a quiet zone. The remaining upper part of the cylinder was provided with a paddle stirrer having blades set just above the top of the quiet zone, a heating coil and an inlet tube.

An exit tube was positioned so that its lower end lead from the bottom of the dead zone and its upper, open end was positioned alongside the upper part of the tube reactor at a point 10 inches above the top of the quiet zone.

To this reactor was charged 2,325 ml. of a liquid isocyanate product prepared as described in Example 2 by heating methylenebis(phenyl isocyanate) with 1% triethylphosphate at 200 to 210° C. for 4 hours. This initial charge was stirred and heated until the temperature reached 191° C. at which point a mixture of methylenebis(phenyl isocyanate) [isocyanate equivalent 126.6; containing 6.9% 2,4′-isomer and 93.1% 4,4′-isomer; prepared as described for starting material of Example 1] and 1% (by weight of isocyanate) of triethyl phosphate was charged to the reactor at an initial rate of 55.5 ml./min. Effluent was collected from the exit tube at the same rate. The feed rate and the temperature of the reaction mixture were slowly increased as indicated in the following table which also indicates fractions of effluent collected. A volume of effluent corresponding to the original charge present in the reaction vessel had been eliminated from the vessel at the end of 75 minutes reaction time.

| Time (from start of feed) | Temperature, °C., of reaction mixture | Feed rate (ml./min.) | Fraction of effluent |
|---|---|---|---|
| 0 | 191 | 55.5 | Original charge |
| 30 | 220 | 75 | Original charge |
| 55 | 246 | 96 | Original charge |
| 75 | 250 | 96 | Original charge |
| 80 | 250 | 111 | 1 |
| 90 | 244 | 111 | 1 |
| 104 | 243 | 111 | 1 |
| 110 | 243 | 111 | 2 |
| 120 | 246 | 111 | 2 |
| 123 | 246 | 111 | 2 |
| 125 | 246 | 111 | 3 |
| 135 | 250 | 111 | 3 |
| 140 | 253 | 165 | 3 |
| 142 | 252 | 165 | 4 |
| 146 | 248 | 165 | 4 |
| 155 | 240 | 165 | 4 |
| 156 | 240 | 165 | 5 |
| 160 | 237 | 165 | 5 |
| 168 | 234 | 165 | 5 |
| 174 | 233 | 165 | 6 |
| 185 | 230 | 165 | 6 |
| 189 | 232 | 165 | 6 |
| 192 | 240 | 0 | 7 |
| 195 | 253 | 0 | 7 |
| 197 | 255 | 0 | 7 |

The following table summarizes the average reactor residence time (calculated from feed rates on the basis of simple plug flow) and range of reaction temperature for each of the above fractions, and the isocyanate equivalent of each fraction.

| Fraction No. | Average reactor residence time (minutes) | Reaction temperature, °C. | I.E. |
|---|---|---|---|
| 1 | 60 | 230–250 | 146.4 |
| 2 | 45 | 240–250 | |
| 3 | 45 | 240–250 | 146 |
| 4 | 30 | 240–250 | |
| 5 | 30 | 240–250 | 146.5 |
| 6 | 15 | 230–250 | 139.5 |
| 7 | 15 | 230–245 | 141.2 |

Aliquots of each of fractions 1, 3, 5, 6 and 7 were blended with the appropriate amount of methylenebis(phenyl isocyanate) (identical to that employed as starting material) to give a final mixture having an isocyanate equivalent of approximately 135. The blending was carried out by heating the components at 50° C. with stirring under nitrogen until a homogeneous liquid was obtained, followed by cooling of the product at room temperature (about 25° C.). The blends so obtained showed no sign of solidification or separation of solid material on prolonged storage at temperatures as low as 15° C.

EXAMPLE 4

The isocyanate employed as starting material in the following process was a mixture of polymethylene polyphenyl isocyanates containing approximately 70 parts by weight of methylenebis(phenyl isocyanate) the remainder of said mixture being polymethylene polyphenyl isocyanates having a functionality greater than 2.0. Said polyisocyanate had an equivalent weight of 130, a viscosity of 50 cps. at 25° C., an average functionality of 2.2 and a specific gravity of 120 at 20° C.

A mixture of 240.2 g. of the above isocyanate and 0.6 g. of triethyl phosphate was heated to 190° C. during the course of 0.5 hr. and then held at 200 to 210° C. for 1 hr. The resulting mixture was quickly cooled (over a period of about 5 minutes) to 85° C. and thereafter allowed to cool to room temperature. The product so obtained had an isocyanate equivalent of 146.1, a hydrolyzable chlorine content of 0.15%, a viscosity of 348 cps. at 25° C. and a specific gravity of 1.35 at 25° C.

A blend was prepared by admixture at about 20° C. of 110 g. of the product prepared as described above and 90 g. of isocyanate taken from the same batch as that used as starting material. The blend so obtained had an isocyanate equivalent of 138 and showed no sign of solidification or separation of solid material on prolonged storage at room temperatures as low as 10° C.

We claim:
1. An isocyanate composition which is a storage stable liquid at temperatures above about 15° C., which composition comprises the product obtained by heating a methylenebis(phenyl isocyanate) which is not normally a stable liquid at about 15° C. with from about 0.1% to about 3% by weight of a trihydrocarbyl phosphate, wherein hydrocarbyl is from 1 to 12 carbon atoms, inclusive, at a temperature within the range of about 160° C. to about 250° C. until the isocyanate equivalent of the mixture is within the range of about 138 to about 200 and blending the product so obtained with sufficient untreated methylenebis(phenyl isocyanate) at a temperature above the melting point of the latter but below 100° C. to obtain a final mixture having an isocyanate equivalent within the range of about 127 to about 140.

2. A composition of claim 1 wherein the trihydrocarbyl phosphate employed is triethyl phosphate.

3. A composition of claim 1 wherein the methylenebis(phenylisocyanate) which is not normally a stable liquid at about 15° C. is a mixture containing approximately 90% by weight of 4,4'-methylenebis(phenyl isocyanate) and approximately 10% by weight of 2,4'-methylenebis(phenyl isocyanate).

4. A process for producing an isocyanate composition which is a stable liquid at temperatures above about 15° C. which comprises heating a methylenebis(phenyl isocyanate) which is not normally a stable liquid at about 15° C. with from about 0.1% to about 3% by weight of a trihydrocarbyl phosphate, wherein hydrocarbyl is from 1 to 12 carbon atoms, inclusive, at a temperature within the range of about 160° C. to about 250° C. until the isocyanate equivalent of the mixture is within the range of about 138 to about 200 and blending the product so obtained with sufficient untreated methylenebis(phenyl isocyanate) at a temperature above the melting point of the latter but below 100° C. to obtain a final mixture having an isocyanate equivalent within the range of about 127 to about 140.

5. The process of claim 4 wherein the trihydrocarbyl phosphate is triethyl phosphate.

6. The process of claim 4 wherein the methylenebis(phenylisocyanate) employed as starting material and as blending material is a mixture containing approximately 90% by weight of 4,4'-methylenebis(phenyl isocyanate) and approximately 10% by weight of 2,4'-methylenebis(phenyl isocyanate).

7. The process of claim 4 wherein the methylenebis(phenylisocyanate) employed as starting material and as blending material has been obtained by distillation of a mixture of polyisocyanates produced by phosgenation of a mixture of polyamines derived by condensation of aniline and formaldehyde in the presence of hydrochloric acid.

8. The process of claim 4 wherein the methylenebis(phenylisocyanate) employed as starting material is a mixture of polymethylene polyphenyl isocyanates containing from about 65% by weight to about 100% by weight of methylenebis(phenyl isocyanates) the remaining 35% to 0% by weight of said mixture being polymethylene polyphenyl isocyanates of functionality higher than 2.0.

9. A process for producing an isocyanate composition which is a stable liquid at temperatures above about 15° C. which comprises passing a mixture of a methylenebis(phenyl isocyanate), which is not normally a stable liquid at about 15° C., and from about 0.1% to about 3% by weight of a trihydrocarbyl phosphate, wherein hydrocarbyl is from 1 to 12 carbon atoms, inclusive, through a heating zone maintained at a temperature within the range of about 160° C. to about 250° C., the rate of flow of the mixture through the heating zone being so adjusted that the isocyanate equivalent of the effluent is within the range of about 138 to about 200, and blending the product so obtained with sufficient untreated methylenebis(phenyl isocyanate) at a temperature above the melting point of the latter but below 100° C. to obtain a final mixture having an isocyanate equivalent within the range of about 127 to about 140.

10. The process of claim 9 wherein the trihydrocarbyl phosphate is triethyl phosphate.

11. The process of claim 9 wherein the methylenebis(phenylisocyanate) employed as starting material and as blending material is a mixture containing approximately 90% by weight of 4,4'-methylenebis(phenyl isocyanate) and approximately 10% by weight of 2,4'-methylenebis(phenyl isocyanate).

12. The process of claim 9 wherein the methylenebis(phenylisocyanate) employed as starting material and as blending material has been obtained by distillation of a mixture of polyisocyanates produced by phosgenation of a mixture of polyamines derived by condensation of aniline and formaldehyde in the presence of hydrochloric acid.

13. The process of claim 9 wherein the methylenebis(phenylisocyanate) employed as starting material is a mixture of polymethylene polyphenyl isocyanates containing from about 65% by weight to about 100% by weight of methylenebis(phenyl isocyanates) the remaining 35% to 0% by weight of said mixture being polymethylene polyphenyl isocyanates of functionality higher than 2.0.

References Cited
UNITED STATES PATENTS

| | | | |
|---|---|---|---|
| 2,884,361 | 4/1959 | Bloom et al. | 260—453 XR |
| 2,957,903 | 10/1960 | Spiegler | 260—453 |
| 2,999,106 | 9/1961 | Prosser et al. | 260—453 |

CHARLES B. PARKER, *Primary Examiner.*

D. H. TORRENCE, *Assistant Examiner.*

U.S. Cl. X.R.

260—2.5, 77.5, 453, 45.7